United States Patent [19]

Haugen

[11] Patent Number: 4,593,967
[45] Date of Patent: Jun. 10, 1986

[54] 3-D ACTIVE VISION SENSOR

[75] Inventor: Paul R. Haugen, Bloomington, Minn.

[73] Assignee: Honeywell Inc., Minneapolis, Minn.

[21] Appl. No.: 667,312

[22] Filed: Nov. 1, 1984

[51] Int. Cl.$^4$ .................. G02B 26/10; G01C 3/00; G01B 11/24

[52] U.S. Cl. .................. 350/3.71; 356/1; 356/376

[58] Field of Search .............. 350/3.71; 356/1, 376, 356/152

[56] References Cited

U.S. PATENT DOCUMENTS 3,426,211  2/1969  Anderson .................. 356/135
4,136,949  1/1979  Hayamizu et al. .......... 356/1
4,317,991  3/1982  Stauffer .................. 356/4

FOREIGN PATENT DOCUMENTS 3147129  6/1983  Fed. Rep. of Germany ..... 350/3.71

OTHER PUBLICATIONS

Jarvis, "A Perspective on Range Finding Techniques for Computer Vision", IEEE Transactions on Pattern Analysis & Machine Intelligence, vol. PAMI-5, No. 2, Mar. 83, pp. 122-139.
Parthasarathy et al., "Laser Rangefinder for Robot Control & Inspection", SPIE vol. 336 Robot Vision, 1982, pp. 2-11.
Ih, "Design Considerations of 2-D Holographic Scanners", Applied Optics, vol. 17, No. 5, Mar. 1, 1978, pp. 748-754.
Kanade et al., "Scanning Laser Rangefinder", Carnegie-Mellon University, date unknown.

Primary Examiner—John K. Corbin
Assistant Examiner—B. S. Shapiro
Attorney, Agent, or Firm—Omund R. Dahle

[57] ABSTRACT

This invention is to a three dimensional active vision sensor. This invention uses a multifacet holographic scanner to move a laser spot across an object at high speed in a raster pattern and a digital position detector to give a highly accurate, low noise, digital representation of the angle to the laser spot on the object. The integration of these two devices is a unique solution for providing range (3-dimensional data) of an arbitrary object in real time.

23 Claims, 5 Drawing Figures

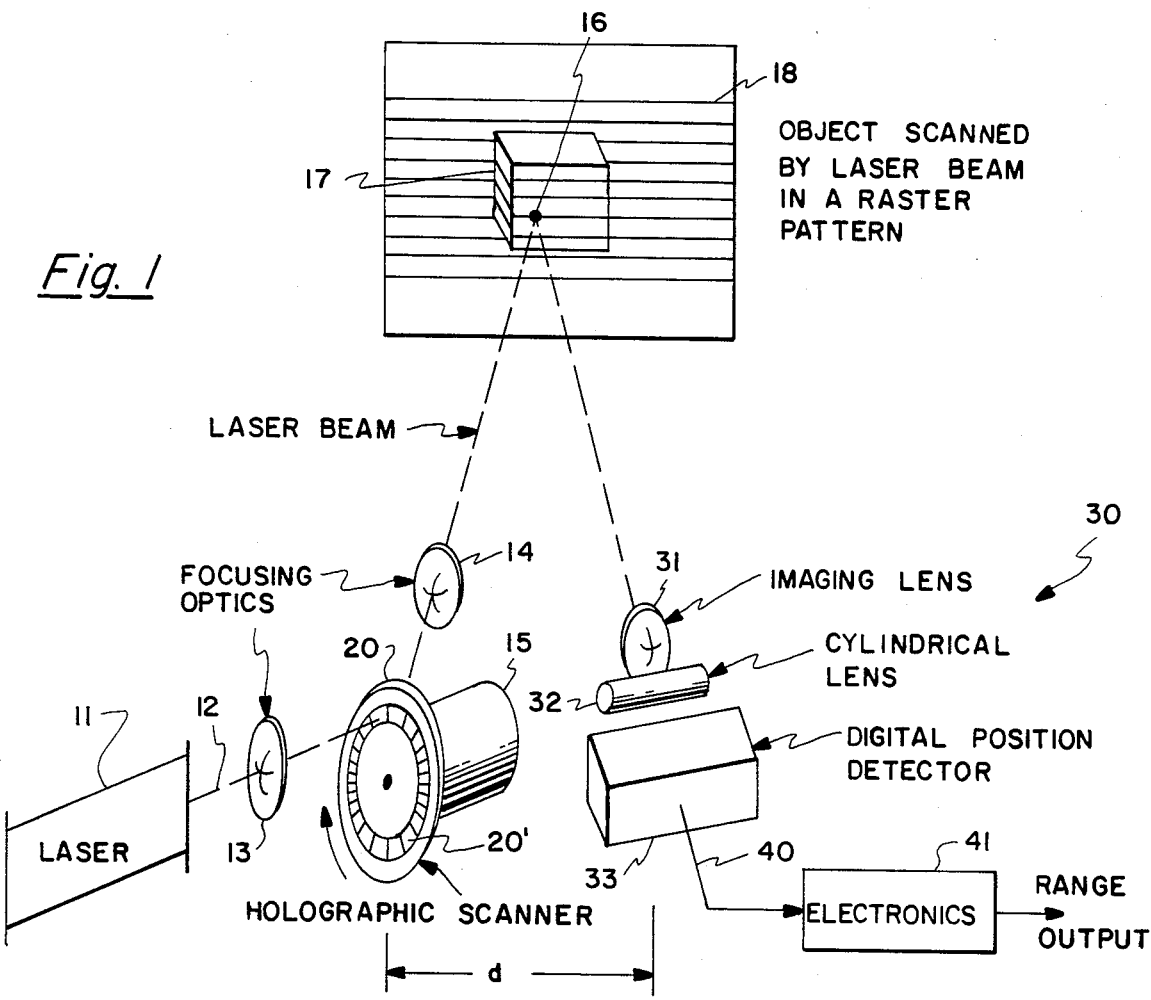
Fig. 1
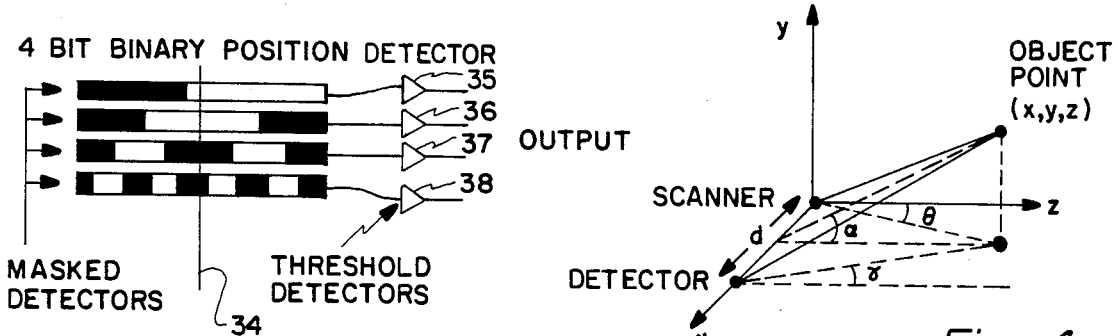
Fig. 2
Fig. 4
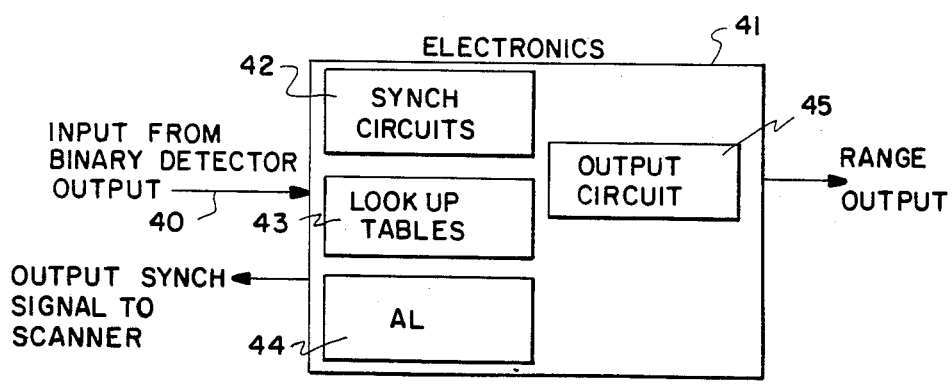
Fig. 3

3-D ACTIVE VISION SENSOR

BACKGROUND AND SUMMARY OF THE INVENTION

The present invention is directed to the field of optical detection and recognition of 3-dimensional objects. The capability of vision is desired in many applications in which a machine interacts with its surrounding environment. Typical applications for visions systems include inspection systems and industrial robots. In this invention there is described a high speed 3-D sensor which produces, at a high rate of speed, a dense range map of the object space. The sensor consists of a scanned laser beam, a digital angle detector and the necessary range processing electronics. By using triangulation, the range to a dense array of points on the object can be determined in real time providing 3-D of the object necessary for the inspection and recognition of an object and the detection of its location.

BRIEF DESCRIPTION OF THE DRAWINGS

FIG. 1 is a diagrammatic representation of a 3-D Active Vision Sensor system according to the invention.

FIG. 2 is a sketch of a binary position detector used in the invention.

FIG. 3 is a block diagram schematic of the electronic circuit used in FIG. 1.

FIG. 4 identifies various significant angles of light transmission and reception in the apparatus of FIG. 1.

DESCRIPTION

Figure 5:
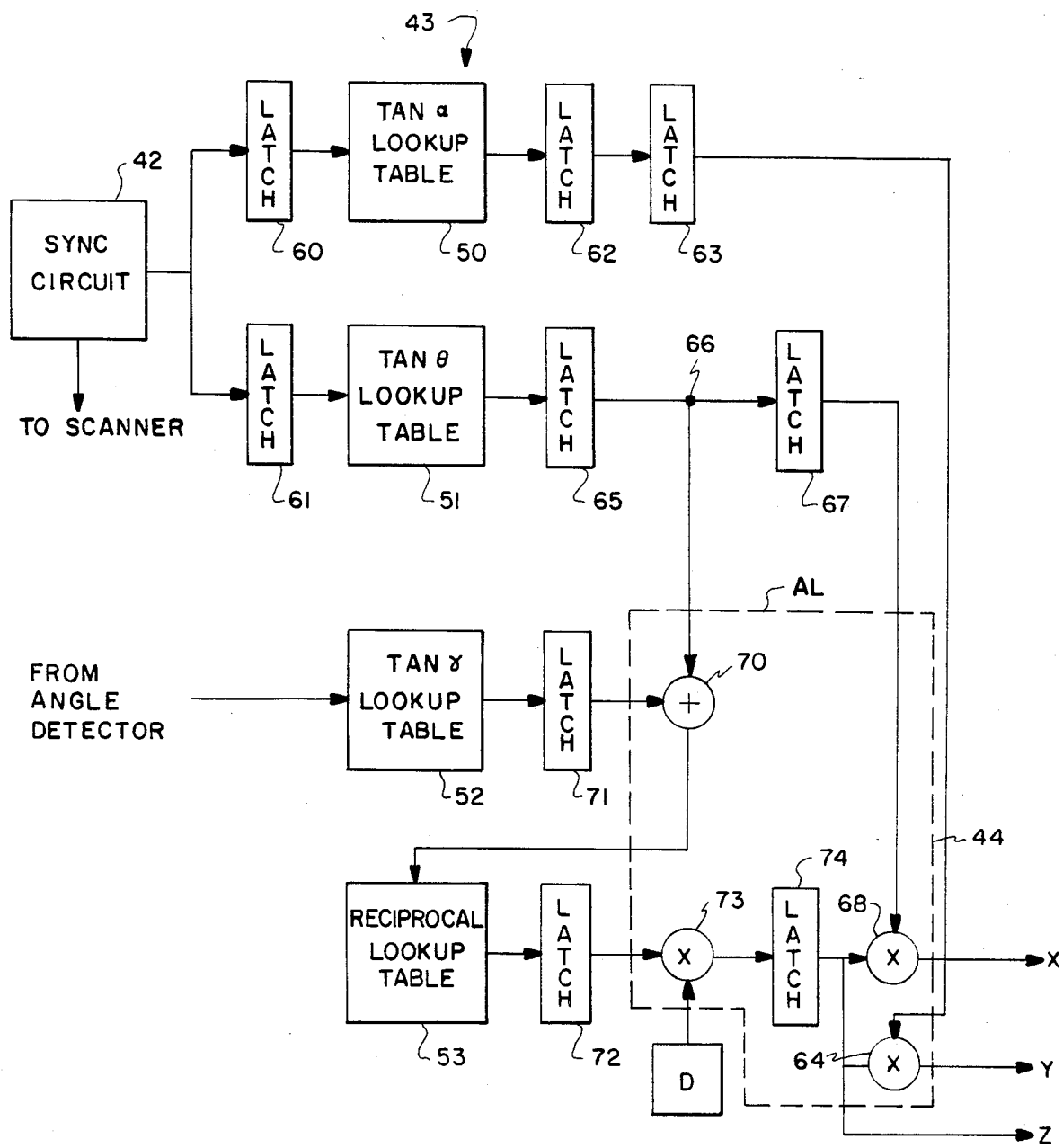
FIG. 5 is a more detailed explanation of FIG. 3.

The apparatus according to this invention scans an object in a raster pattern, determines the range to the object at an array of points along the raster, and outputs the range to the array of points in real time. In FIG. 1 there is shown a light source 11 in the form of a laser, which directs a beam of light 12 through suitable focussing optics 13 and 14 and a holographic scanner 15 to illuminate a point 16 on the object 17 to be inspected. The laser 11 has the necessary intensity to produce a small bright spot on the surface of the object which can be detected.

The holographic scanner 15 as shown is a multifaceted type and is used to move the point of light across the object 17 in a raster pattern 18. In this invention by raster pattern is meant a pattern of multiple straight parallel lines, each line separated spatially in a direction orthogonal from the direction of the lines. The holographic scanner 15 scans the light source by rotating a diffraction grating 20 through the light beam 12. This effectively changes the spatial frequency of the grating 20 with respect to the light beam 12, thus diffracting the light at a continuously changing angle. By rotating one grating through the beam, one line is produced on the object. The multiple line scan is produced by placing many facets, in a circular configuration, on a single disk shaped substrate. Each facet contains a single diffraction grating 20′ which produces a single scanned line. The complete raster scan is produced by rotating the disk one rotation while using each facet separately to produce the separate lines.

A digital angle sensor 30, placed off-axis, detects the position (i.e., detects the angle) of the light spot 16 on the object 17 at any point in time. The digital angle sensor 30 comprises an imaging lens 31, a cylindrical lens 32 and a digital position detector 33. The cylindrical lens 32 is placed in front of the detector 33 to convert the image of the light spot into a line of light 34, orthogonal to the longest dimension of the detectors. In the exemplory figure shown the digital position detector 33 is implemented by a 4 bit binary mask (e.g. Gray Code) placed over a set of long, narrow detectors, see FIG. 2. The detector is not limited to the 4 bit device shown and may be expanded as desired to increase the resolution. As the spot moves across the object, the line moves across the detectors, selectively illuminating different masked/unmasked combinations of the detector, and producing the digital angle representation. Each detector corresponds to a single bit of the digital word representing the position of the spot. Thus the angle detection is accomplished by imaging the light spot falling on the object 17 onto the position detector 33. Threshold detectors 35, 36, 37 and 38 are used to detect the presence of light on the active region of each of the detectors. The presence of light corresponds to a digital "1" in the digital output word. The output signal of the digital position detector is connected 40 to an electronics package 41. With the line of light 34 positioned as shown in FIG. 2, this output signal will provide an indication of light at 35 and 36. The advantage of this approach is two fold. First, a direct representation of this angle is available at the output after a small nominal delay (i.e. response time of the detector). Secondly, the light need only be detected, no value of return intensity or analog voltage need be recognized.

The electronics package 41, which is shown in somewhat expanded form in FIG. 3, and which includes synch. circuits 42, lookup tables 43, arithmetic logic (AL) 44 and output circuit 45, converts the angle information into range information. The range is calculated by utilizing the angle information, the distance, d, between the detector and the scanner to triangulate to the spot on the object using trigonometric functions. The electronics also provide the synchronization signals to the scanner and the output port. The output range information is converted to a format compatible with the application.

In considering the angle information from the scanner 15 to the spot of light 16 on the object 17, and from the spot of light to the detector 33, reference is made to FIG. 4 in which the scanner 15 and detector 33 are shown spatially separated by a known distance "d". The indicated x-axis and z-axis lie in the plane of the paper. The angle $\alpha$ is the angle of elevation of the scanned line with respect to the plane of the paper. The scanner diffraction of the light is assumed to operate similar to the pivoting of the light around one point, scanning the laser beam in angle $\theta$ and $\alpha$. Since the scanner is locked to the synch circuits, the angles $\theta$ and $\alpha$ are continuously known. The detector 33 determines the angle $\gamma$. The lookup tables, AL and output circuit electronics 43, 44 and 45 determine x, y and z to determine the absolute position of the object in space.

The relevant equations to determine x, y and z are:

$$z = d/(\tan\theta + \tan\gamma)$$

$$x = z \tan\theta$$

$$y = z \tan\alpha$$

FIG. 5 shows a block diagram of the lookup tables 43 which appear as tan $\alpha$ lookup table 50, tan $\theta$ lookup table 51, tan γ lookup table 52 and reciprocal lookup table 53. The synch circuit 42 of FIG. 5 is connected through a latch 60 to the lookup table 50 and is also connected through a latch 61 to lookup table 51. The output of tan α lookup table 50 is connected through serially connected latches 62 and 63 to one input of a multiplier 64 in the arithmetic logic 44. The latch 63 should be of a type providing a delay of two clock periods. The output of tan θ lookup table 51 is connected through a latch 65, a junction 66, and a latch 67 (the type of which provides a delay of two clock periods) to one input of a multiplier 68 in the AL. The junction 66 is also connected to one input of an adder 70 in the AL. The tan γ lookup table 52 receives an input from the angle detector 33. The output of tan γ lookup table 52 is connected by a latch 71 to the other input of adder 70 and the output of the adder 70 is connected to the input of the reciprocal lookup table 53. The output of reciprocal lookup table 53 is connected through a latch 72 to one input of a multiplier 73 in the AL, the other input of which receives the data relating to the dimension "d". The output of multiplier 73 is connected through a latch 74 to three points. It is connected to the output terminal z, to the second input of multiplier 64, and to the second input of multiplier 68. The output of multiplier 64 is connected to the output terminal Y and the output of the multiplier 68 is connected to the output terminal X.

In the embodiment described, the lookup tables may be RAMs such that new information can be loaded if the scanner or application changes. The clock period for the latches must be slower than the speed of the lookup tables and the multipliers (~100 ns). Therefore, throughput rate for this configuration embodiment is on the order of 10 MHz. A $(256 \times 256) \times 30$ frames a second requires a throughput of ~2 MHz, well within the capabilities of the device. If slower speeds are specified, the latches may be removed from the system. Assuming a $256 \times 256$ field and a 10 bit sensor, lookup tables A and B are $256 \times 8$ in size and tables C and D are $1024 \times 10$ in size. The system as described, is designed with no approximations in mind. The output of the processor gives the absolute value of the position of the post on the object in x, y and z coordinates. The system may be simplified, however, by assuming tan $\theta = \theta$ for some applications.

In summary of operation, the laser emits light continuously. Lenses are used to focus the laser beam through the holographic scanner and onto the object as a spot. The holographic scanner is synchronized from the electronics to move the light spot. As the spot of light 16 travels across the object 17, the angle sensor 30 detects the angle γ to that point on the object. The electronics calculate the range to the point from the measured angle and knowledge of the baseline distance, d, and the angle position of the scanned beam. The synchronization circuit provides a synch signal to the output circuit providing beginning of frame and beginning of line information for output.

A number of advantages arise from the use of this system. The multifacet holograhpic scanner is low mass and produces the entire raster pattern with a single rotation of the hologram. The digital detector produces digital representation of the angle without the noise and optical dynamic range constraints which are associated with similar analog position sensors. The system is capable of producing the range data in real time. The data presented at the output of the sensor is absolute range data. No extensive post-processing is required to obtain the range data.

The embodiments of the invention in which an exclusive property or rights is claimed are defined as follows:

1. A real-time three-dimensional active vision sensor system comprising:
    scanner means scanning a focussed light beam across the surface of an object so that an illuminated spot scans across said surface, the object to be 3-D range mapped, in which the scanning angle θ of the light beam is continuously changing during each scan;
    light receiving means including digital angle sensor means, said digital angle sensor means being positioned a fixed distance "d" from said scanner means to detect the angle γ from which the light is being received from said surface due to said light beam, and to provide a digital output which is representative of the angle γ from which the light is being received; and,
    electronic means connected to the digital angle sensor means for converting by triangulation the distance "d" (separating the scanner means and digital angle sensor means) and instantaneous values of angle θ and angle γ to absolute x,y,z coordinates representative of the instantaneous position of the light beam at the object surface.

2. The sensor system according to claim 1 in which, said scanner means is a holographic scanner means having many small facets placed around one radius of a substrate.

3. The sensor system according to claim 2 in which, said scanner means substrate is rotated and in one rotation of the scanner means substrate, each facet is moved through the light beam to produce the entire raster pattern.

4. The sensor system according to claim 2 in which, each of said facets contains a single hologram which produces a single raster scan line.

5. The sensor system according to claim 3 in which, each of said holograms is an optical diffraction grating.

6. The sensor system according to claim 1 in which, said light beam is a laser beam.

7. The sensor system according to claim 1 in which, said electronic means includes lookup tables and arithmetic logic for converting the instantaneous values of the angles to the x, y, z coordinates.

8. The sensor system according to claim 1 in which, said digital position light detecting means comprises an imaging lens and a cylindrical lens for converting the received light, from said illuminated spot of light on the object, into a line of light which impinges on a digital detector array comprising an array of long narrow detectors masked in a binary code, the line of light oriented orthogonally to the individual detectors impinges along the binary coded detectors at a position which position therealong is a function of the input angle γ to the lens 31, said digital position light detecting means providing a digital output word to said electronic means representative of said input angle.

9. The sensor system according to claim 1 in which the scanning light beam from said scanner means to said object has an elevation angle α as well as the continuously changing scanning angle θ, the elevation angle α being caused to incrementally change with each successive scan to create a raster pattern across the surface of the object.

10. The sensor system according to claim 9 in which said electronic means further comprises:

a tan α lookup table;
a tan θ lookup table;
a tan γ lookup table;
a reciprocal lookup table;
synchronization circuit means having output means connected to said scanner means, to said tan α lookup table and to said tan θ lookup table to sync the tangent lookup tables to the scanner position;
means connecting said digital output to said tan γ lookup table;
summing means summing the output of said tan γ lookup table and the output of said tan θ lookup table, the output of said summing means being connected to said reciprocal lookup table;
first multiplication means for multiplying together the output of said reciprocal lookup table and a number D representing the distance "d", the output signal of said multiplication means representing the z coordinate;
second multiplication means for multiplying together the output of said first multiplication means and the output of said tan θ lookup table, the output signal of said second multiplication means representing the x coordinate; and,
third multiplication means for multiplying together the output of said first multiplication means and the output of said tan α lookup table, the output signal of said third multiplication means representing the y coordinate.

11. A real-time three-dimensional active vision sensor system comprising:
a laser for providing a narrow beam of light;
scanner means including a number of optical diffraction gratings, said scanner means being positioned in the path of said light beam;
said scanner means moving said optical gratings successively through said beam, each grating causing a diffracted beam to scan across the surface of an object whereby the resulting scanning diffracted beam from each grating describes a moving spot of light (i.e. a single raster line) across the object to be scanned, and in which the scanning angle θ of the diffracted beam is continuously changing during each scan line;
a digital angle sensor positioned at a fixed distance "d" from said scanner means and oriented to continuously sense the instantaneous angle γ to the moving spot of light on the object so that the instantaneous angle of the spot with respect to the sensor is known; and,
electronic means connected to the digital angle sensor for converting by triangulation the distance "d" and the instantaneous values of the angles θ and γ to x,y,x coordinates representative of the instantaneous position of the light beam at the object surface.

12. The sensor system according to claim 11 in which, said scanner means is a holographic scanner means having many small facets placed around one radius of a substrate.

13. The sensor system according to claim 12 in which, said scanner means substrate is rotated whereby each facet is moved through the light beam to produce the entire raster pattern.

14. The sensor system according to claim 12 in which, each of said optical diffraction gratings is a hologram.

15. The sensor system according to claim 14 in which, each of said facets contains a single hologram.

16. The sensor system according to claim 11 in which the scanning beam from said scanner means to said object has an elevation angle α as well as the continuously changing scanning angle θ, the elevation angle α being caused to incrementally change with each successive scan to create a raster pattern across the surface of the object.

17. The sensor system according to claim 18 in which said electronic means further comprises:
a tan α lookup table;
a tan θ lookup table;
a tan γ lookup table;
a reciprocal lookup table;
synchronization circuit means having output means connected to said scanner means, to said tan α lookup table and to said tan θ lookup table to sync the tangent lookup tables to the scanner position;
means connecting said digital output to said tan γ lookup table;
summing means summing the output of said tan γ lookup table and the output of said tan θ lookup table, the output of said summing means being connected to said reciprocal lookup table;
first multiplication means for multiplying together the output of said reciprocal lookup table and a number D representing the distance "d", the output signal of said multiplication means representing the z coordinate;
second multiplication means for multiplying together the output of said first multiplication means and the output of said tan θ lookup table, the output signal of said second multiplication means representing the x coordinate; and,
third multiplication means for multiplying together the output of said first multiplication means and the output of said tan α lookup table, the output signal of said third multiplication means representing the y coordinate.

18. The sensor system according to claim 11 in which, said electronic means includes lookup tables and arithmetic logic for converting the instantaneous values of the angles to the x, y, z coordinates.

19. The sensor system according to claim 11 in which, said digital angle sensor comprises an imaging lens and a cylindrical lens for converting the received light, from said moving spot of light on the object, into a line of light which impinges on a digital detector array comprising an array of long narrow detectors masked in a binary code, the line of light oriented orthogonally to the individual detectors impinges along the binary coded detectors at a position which position therealong is a function of the input angle γ to the lens, said digital angle sensor providing a digital output word to said electronic means representative of said input angle.

20. A real-time three-dimensional active vision sensor system comprising:
a laser for providing a narrow beam of light;
holographic scanner means positioned in the path of said light beam for scanning the light beam across the surface of an object, the object to be 3-D range mapped, in which the scanning angle θ of the light beam is continuously changing during each scan, said scanner means having many small facets placed around one radius of a substrate, each of said facets containing a single optical diffraction grating hologram which produces a single raster scan line when moved through said beam, said scanner means substrate being rotated whereby in one rotation each facet is moved through the light beam to produce the entire raster pattern;

receiving means including a light detecting digital angle sensor positioned at a fixed distance "d" from said scanner means and oriented to continuously sense the instantaneous angle $\gamma$ of the moving spot of light on the object so that the instantaneous angle $\gamma$ of the spot with respect to the sensor is known; and, electronic means connected to the angle sensor for converting by triangulation the distance "d" and the instantaneous values of the angles $\theta$ and $\gamma$ to x,y,x coordinates representative of the instantaneous position of the light beam at the object surface.

21. The sensor system according to claim 20 in which, said digital angle sensor comprises an imaging lens and a cylindrical lens for converting the received light, from said moving spot of light on the object, into a line of light which impinges on a digital detector array comprising an array of long narrow detectors masked in a binary code, the line of light oriented orthogonally to the individual detectors impinges along the binary coded detectors at a position which is a function of the input angle $\gamma$ to the lens 31, said digital angle sensor providing a digital output word to said electronic means representative of said input angle.

22. The sensor system according to claim 20 in which, the scanning light beam from said holographic scanner means to said object has an elevation angle $\alpha$ as well as the continuously changing scanning angle $\theta$, the elevation angle $\alpha$ being caused to incrementally change with each of said facets.

23. The sensor system according to claim 22 in which said electronic means further comprises:

a tan $\alpha$ lookup table;
a tan $\theta$ lookup table;
a tan $\gamma$ lookup table;
a reciprocal lookup table;
synchronization circuit means having output means connected to said scanner means, to said tan $\alpha$ lookup table and to said tan $\theta$ lookup table to sync the tangent lookup tables to the scanner position;
means connecting said digital output to said tan $\gamma$ lookup table;
summing means summing the output of said tan $\gamma$ lookup table and the output of said tan $\theta$ lookup table, the output of said summing means being connected to said reciprocal lookup table;
first multiplication means for multiplying together the output of said reciprocal lookup table and a number D representing the distance "d", the output signal of said multiplication means representing the z coordinate;
second multiplication means for multiplying together the output of said first multiplication means and the output of said tan $\theta$ lookup table, the output signal of said second multiplication means representing the x coordinate; and,
third multiplication means for multiplying together the output of said first multiplication means and the output of a said tan $\alpha$ lookup table, the output signal of said third multiplication means representing the y coordinate.

* * * * *